United States Patent
Reese et al.

(10) Patent No.: US 11,148,469 B2
(45) Date of Patent: Oct. 19, 2021

(54) HYBRID CORD FOR USE AS REINFORCEMENT IN A BELT BANDAGE OF A PNEUMATIC VEHICLE TIRE

(71) Applicant: Continental Reifen Deutschland GmbH, Hannover (DE)

(72) Inventors: Wolfgang Reese, Peine (DE); Reinhard Ludwig, Bad Münder (DE); Heiner Volk, Neustadt (DE); Thomas Kramer, Herford (DE); Marcel Neumann, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 491 days.

(21) Appl. No.: 15/503,741

(22) PCT Filed: Jun. 9, 2015

(86) PCT No.: PCT/EP2015/062750
§ 371 (c)(1),
(2) Date: Feb. 14, 2017

(87) PCT Pub. No.: WO2016/023656
PCT Pub. Date: Feb. 18, 2016

(65) Prior Publication Data
US 2017/0274706 A1   Sep. 28, 2017

(30) Foreign Application Priority Data
Aug. 15, 2014   (DE) .................... 10 2014 216 260.2

(51) Int. Cl.
*B60C 9/18* (2006.01)
*D02G 3/48* (2006.01)
*B60C 9/00* (2006.01)

(52) U.S. Cl.
CPC ............ *B60C 9/005* (2013.01); *B60C 9/0042* (2013.01); *D02G 3/48* (2013.01); *B60C 2009/0078* (2013.01); *B60C 2009/0092* (2013.01)

(58) Field of Classification Search
CPC .................. B60C 9/005; B60C 9/2003; B60C 2009/2074; B60C 2009/2093; D02G 3/48
See application file for complete search history.

(56) References Cited

U.S. PATENT DOCUMENTS

| 3,631,667 A | * | 1/1972 | Marzocchi | B60C 9/0028 152/559 |
| 4,155,394 A | * | 5/1979 | Shepherd | B60C 9/0042 139/426 R |

(Continued)

FOREIGN PATENT DOCUMENTS

| JP | H06280122 A | 10/1994 |
| JP | 2011241503 A | 12/2011 |

(Continued)

*Primary Examiner* — Justin R Fischer
(74) *Attorney, Agent, or Firm* — Gregory Adams; David L. Cate

(57) ABSTRACT

The invention relates to a hybrid cord for use as a reinforcement in a belt bandage of a pneumatic vehicle tire, consisting of at least two threads with ends which are twisted together. At least one first thread is a high-modulus thread with a specified thread fineness, and another thread is a low-modulus thread, said other low-modulus thread having a lower thread fineness than the first thread. The invention is characterized in that the proportion of the high-modulus thread in the hybrid cord is 80-95 wt. %; the difference between the thread fineness of the high-modulus thread and the thread fineness of the other low-modulus thread is >800 dtex; and the elongation at break of the high-modulus thread ranges from 1%-8%, and the elongation at break of the low-modulus thread ranges from 9%-30%.

20 Claims, 1 Drawing Sheet

(56) References Cited

U.S. PATENT DOCUMENTS

| | | | | |
|---|---|---|---|---|
| 4,807,680 | A | * | 2/1989 | Weidenhaupt .......... D02G 3/48 152/451 |
| 5,558,144 | A | * | 9/1996 | Nakayasu ............. B60C 9/2009 152/526 |
| 6,601,378 | B1 | * | 8/2003 | Fritsch .................... D02G 3/28 57/237 |

FOREIGN PATENT DOCUMENTS

| | | | |
|---|---|---|---|
| JP | 2014500413 | A | 1/2014 |
| WO | 1997/006297 | A1 | 2/1997 |
| WO | 9706297 | A1 | 2/1997 |
| WO | 2009052844 | A1 | 4/2009 |
| WO | 2014102719 | A1 | 7/2014 |

\* cited by examiner

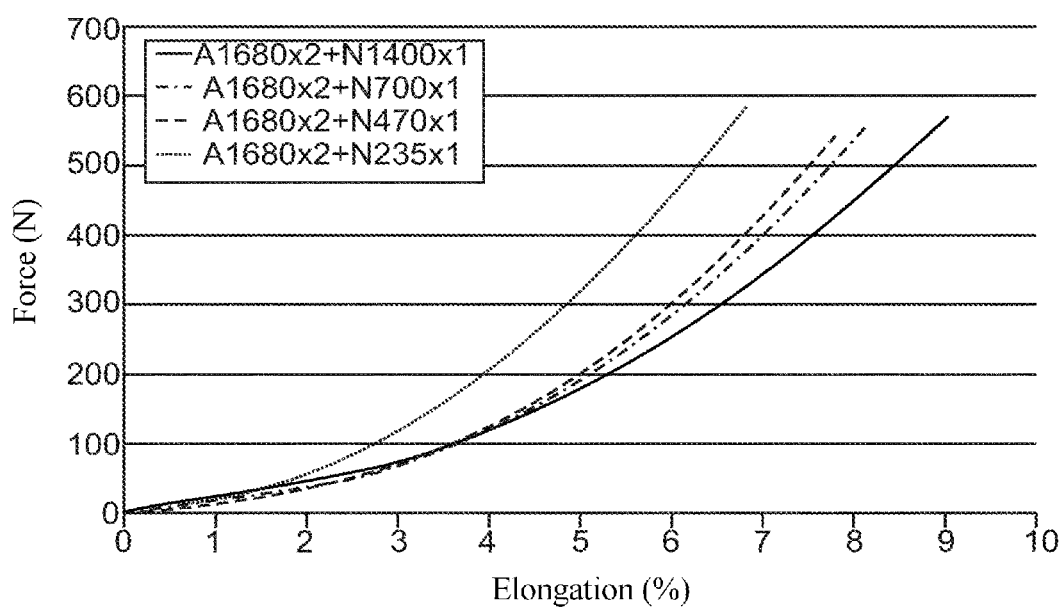

HYBRID CORD FOR USE AS REINFORCEMENT IN A BELT BANDAGE OF A PNEUMATIC VEHICLE TIRE

The invention relates to a hybrid cord for use as reinforcement in a belt bandage of a pneumatic vehicle tire comprising at least two yarns that are twisted together at the ends, at least one first yarn being a high-modulus yarn with a specified yarn fineness and a further yarn being a low-modulus yarn and this further low-modulus yarn having a lower yarn fineness than the first yarn. The invention also relates to a pneumatic vehicle tire that has a belt bandage with such a hybrid cord as reinforcement.

Such a hybrid cord is known from WO 97/06297. The high-modulus yarn is an aramid yarn, while the low-modulus yarn is a polyamide yarn. The hybrid cord is constructed in such a way as to allow a certain structural elongation of the aramid yarn, which purely on the basis of the material has a low extensibility.

The term "high-modulus yarn" means a yarn that consists of a high-modulus material. The term "low-modulus yarn" means a yarn that consists of a low-modulus material.

In this case, the low-modulus yarn and the high-modulus yarn are defined on the basis of the values in (mN/tex) that are described in the following Table 1. The force that has to be respectively applied to a yarn for 1% elongation and for 2% elongation is determined, normalized to the yarn fineness in tex. It is determined in accordance with ASTM D885.

TABLE 1

| Yarn | elongation | |
|---|---|---|
| | 1% | 2% |
| Low-modulus | <150 mN/tex | <200 mN/tex |
| High-modulus | >300 mN/tex | >500 mN/tex |

In the case of pneumatic vehicle tires, in particular when they are used at high speed, to prevent lifting of the tire due to the centrifugal forces occurring during driving, it is known for a pneumatic vehicle tire, which generally comprises an air-impermeable inner layer, a radial carcass that contains reinforcements and reaches from the region of the crown of the tire over the sidewalls into the bead region and is anchored there by wrapping around tension-resistant bead cores, a rubber tread that is located radially on the outside and has tread grooves, and a breaker belt that is between the rubber tread and the carcass, to provide a belt bandage. The belt bandage may be formed as one or more layers, covers at least the edges of the belt and contains reinforcements in the form of cords that run parallel and substantially in the circumferential direction and are embedded in rubber.

During production of the tire, the bandage is applied in the form of plies with reinforcements that are embedded in an unvulcanized rubber mixture and are wound or coiled onto the belt. For such plies, the reinforcements are embedded in rubber, by a group of reinforcements in the form of threads that lie substantially parallel, which are generally pretreated thermally and/or, for better adhesion to the embedding rubber, by impregnation in a way known to a person skilled in the art, running in the longitudinal direction through a calender or an extruder for being coated with a rubber mixture. During the shaping and vulcanizing of the tire, the tire lifts/is elongated generally in the shoulder region up to 2% and in the middle region up to 4% in comparison with the unvulcanized blank if the blank is wound on a flat drum.

The reinforcements of the bandage are intended to allow sufficient elevation during the shaping process and in the vulcanizing mold during production of the tire to allow the tire to be precisely molded, and they are intended to ensure after completion of the tire good high-speed resistance during driving.

A wide variety of cords have already been proposed as reinforcements for the bandage. Thus, for example, EP-B 0 335 588, EP-B 0 661 179 and EP-B 1 475 248 disclose for the reinforcing cords in the belt bandage hybrid cords that are twisted together from yarns with a high modulus of elasticity and a low modulus of elasticity. The hybrid cords mentioned in these documents have specific force-elongation characteristics. In a tensile force/elongation diagram, the cords first have a shallow slope of the curve for low elongation; then the curve rises disproportionately strongly for higher elongation. In this latter region, a small further elongation involves a great expenditure of force. These force-elongation characteristics allow the elevation during the shaping process and the vulcanization and give the tire high-speed resistance.

DE 10 2006 031 780 A1 also discloses a hybrid cord comprising an aramid yarn and a nylon yarn, in which the aramid yarn is thinner than the nylon yarn. However, it has been found in the case of this structural design that the nylon yarn, which serves as a filling yarn and geometrically deflects the aramid yarn helically in order to make it structurally extensible, hinders the elongation of the aramid yarn. Thus, the aramid yarn pre-vulcanizes earlier than desired, and the necessary elongation is not achieved.

The invention is based on the object of providing by simple means a hybrid cord for the belt bandage of a pneumatic vehicle tire that is inexpensive in production and improves the high-speed resistance of the tire comprising this hybrid cord in the belt bandage.

The set object is achieved according to the invention by the proportion of the high-modulus yarn in the hybrid cord being 80-95% by weight, by the difference in the yarn fineness of a high-modulus yarn in comparison with the yarn fineness of the further low-modulus yarn being ≥800 dtex and by the elongation at break of a high-modulus yarn lying in a range of 1%-8% and that of the low-modulus yarn lying in a range of 9%-30%

The hybrid cord according to the invention is distinguished by an extreme asymmetry with regard to the yarn finenesses of a high-modulus yarn in comparison with the low-modulus yarn, while the proportion of the high-modulus material in the hybrid cord is very high and is 80-95% by weight. The yarn of the high-modulus material is made "thick", while the second yarn, which consists of low-modulus material, is made extremely "thin" in comparison with the high-modulus yarn. This extreme asymmetry with regard to the yarn finenesses in the hybrid cord has surprisingly proven to be very suitable for use in the belt bandage. The hybrid cord has the extensibility necessary for elevation with little expenditure of force and, as from about 3% to 4% elongation, then only a very low extensibility.

Initially, the low-modulus yarn having the very low yarn fineness acts primarily. This is particularly advantageous for the residual elevation of the green tire in the heating mold. For greater elongations, the thick high-modulus yarn acts predominantly, whereby the circumferential growth at high speed is kept small. The hybrid cord is optimally adapted to the requirements demanded-allowing the residual elevation and little circumferential growth at high speed.

The hybrid cord according to the invention comprises a low-modulus yarn and at least one or more high-modulus yarns.

The elongation at break is determined in accordance with ASTM D885.

It is advantageous if the elongation at break of the high-modulus yarn lies in a range of 3%-6% and that of the low-modulus yarn lies in a range of 15%-25%.

It is advantageous if this cord comprises two high-modulus yarns of the same fineness and one low-modulus yarn of low fineness. The greater asymmetry produced brings about a desired shallower initial region of the force/elongation curve.

It is expedient if the proportion of the high-modulus yarn in the hybrid cord is 85-95% by weight and the difference of the yarn fineness of a high-modulus yarn in comparison with the yarn fineness of the further low-modulus yarn is ≥1150 dtex. The greater asymmetry produced brings about a desired still shallower initial region of the force/elongation curve.

It is advantageous if the proportion of the high-modulus yarn in the hybrid cord is 90-95% by weight and the difference of the yarn fineness of a high-modulus yarn in comparison with the yarn fineness of the further low-modulus yarn is >1400 dtex. Up to an optimum, a higher proportion of aramid and a great difference in comparison with the low-modulus material produces increasingly shallower initial regions of the force/elongation curve.

Advantageously, the high-modulus yarn consists of one of the materials mentioned below:

carbon fiber, glass fiber, basalt, aromatic polyamide.

Advantageously, the low-molecular yarn consists of a polyamide or a polyester. The polyamides (PA) may be the polyamides PA 4.6, PA 6, PA 6.6, PA 10.10, PA 11 and/or PA12, preferably PA 6.6 or PA 10.10. The polyesters may be the polyesters polyethylene naphthalate (PEN), polyethylene furanoate (PEF), polybutylene terephthalate (PBT), polybutylene naphthalate (PBN), polypropylene terephthalate (PPT), polypropylene naphthalate (PPN), polyethylene terephthalate (PET), high-modulus low-shrinkage PET (HMLS-PET), in particular thermoplastic polyesters and/or crosslinked unsaturated polyesters.

In one specific embodiment, the hybrid cord has the construction aramid 1680×2+nylon 700×1 or the construction carbon fiber 1600×2+nylon 700×1. Two twisted aramid yarns or carbon fiber yarns each with a fineness of 1680 dtex and 1600 dtex, respectively, are twisted together at the ends with a nylon yarn with a fineness of 700 dtex.

In another embodiment of the invention, the hybrid cord has the construction aramid 1680×2+nylon 470×1 or the construction carbon fiber 1600×2+nylon 470×1. Two twisted aramid yarns or carbon fiber yarns each with a fineness of 1680 dtex and 1600 dtex, respectively, are twisted together at the ends with a nylon yarn with a fineness of 470 dtex.

In yet another embodiment of the invention, the hybrid cord has the construction aramid 1680×2+nylon 235×1 or the construction carbon fiber 1600×2+nylon 235×1. Two twisted aramid yarns or carbon fiber yarns each with a fineness of 1680 dtex and 1600 dtex, respectively, are twisted together at the ends with a nylon yarn with a fineness of 235 dtex.

The invention likewise relates to a pneumatic vehicle tire of a radial type of construction with a multi-ply breaker belt and a belt bandage that covers the belt radially on the outside and comprises as reinforcement a hybrid cord according to one or more of the aforementioned embodiments.

A preferred exemplary embodiment is a hybrid cord comprising two aramid yarns each with a yarn fineness of 1680 dtex and comprising a nylon yarn with a yarn fineness of 470 dtex. The aramid yarns have a first twist each with a number of turns of 300 T/m (turns per meter), either in the Z direction or in the S direction. The nylon yarn likewise has a first twist with a number of turns of 300 T/m, corresponding to the twisting direction of the aramid yarns.

The two aramid yarns and the one nylon yarn are twisted at the ends to form a hybrid cord, the twisting direction of which is opposite to that of the individual yarns. Thus, for example, with a twisting direction S of the yarns, the cord is twisted in the direction Z. The number of turns of the cord is 300 T/m.

FIG. 1 indicates force-elongation curves of dipped hybrid cords according to the invention for use in a belt bandage. "Dipped" means: the cord has been impregnated in a way known to a person skilled in the art after twisting, and if need be weaving, in a dipping solution, and thereby provided with a rubber-friendly finish, and stretched under the effect of temperature.

Force-elongation curves of 3 hybrid cords according to the invention of the constructions aramid 1680×2+nylon 235×1, aramid 1680×2+nylon 470×1 and aramid 1680×2+nylon 700×1 and also of a hybrid cord of the prior art of the construction aramid 1680×2+nylon 1400×1 are shown. It is evident that particularly the cords according to the invention aramid 1680×2+nylon 470×1 and aramid 1680×2+nylon 700×1 have a shallower, therefore more advantageous, progression up to about 3%-4% elongation than the cord of the prior art. Moreover, in the further progression, the two aforementioned cords according to the invention have a far higher modulus, that is to say rise significantly more steeply than the cord of the prior art, which has an advantageous effect on the high-speed resistance of the tire.

The invention claimed is:

1. A hybrid cord incorporated in a belt bandage of a pneumatic vehicle tire, the hybrid cord comprising at least a first yarn having a first end and a second yarn having a second end, wherein the first end and the second end are twisted together, and wherein the proportion of the first yarn in the hybrid cord is 80-95% by weight and an asymmetry of the first yarn and the second yarn is based on a shallow initial region of a force/elongation curve;

wherein the first yarn is a high-modulus yarn with a specified yarn fineness based on a selected residual elevation and selected circumferential growth, wherein the second yarn being is a low-modulus yarn and having a lower yarn fineness than the first yarn, and wherein the yarn fineness of the first yarn in comparison with the yarn fineness of the second yarn is ≥1150 dtex;

wherein the elongation at break of the first yarn lies in a range of 1%-8% and the elongation at break of the second yarn lies in a range of 9%-30%;

wherein a difference of the yarn count of the high modulus yarn and the low modulus yarn is greater than 800 dtex; and wherein an extreme asymmetry of the yarn fineness of the first yarn in comparison with the yarn fineness of the second yarn facilitates high speed resistance of the tire where the first yarn operates predominantly for greater elongations.

2. The hybrid cord as claimed in claim 1, characterized in that the elongation at break of first yarn lies in a range of 3%-6% and the elongation at break of the second yarn lies in a range of 15%-25%.

3. The hybrid cord as claimed in claim 1, wherein the hybrid cord further comprises a high-modulus yarn of the same fineness as the first yarn.

4. The hybrid cord as claimed in claim 1, wherein the proportion of the first yarn in the hybrid cord is 90-95% by weight and the difference of the yarn fineness of the first yarn in comparison with the yarn fineness of the second yarn is ≥1400 dtex.

5. The hybrid cord as claimed in claim 1, wherein the first yarn is carbon fiber, glass fiber, basalt or aromatic polyamide.

6. The hybrid cord as claimed in claim 1, wherein the second yarn is a polyamide or a polyester.

7. The hybrid cord as claimed in claim 1 having a construction of aramid 1680×2+nylon 700×1, or a construction of carbon fiber 1600×2+nylon 700×1.

8. The hybrid cord as claimed in claim 1 having a construction of aramid 1680×2+nylon 470×1, or a construction of carbon fiber 1600×2+nylon 470×1.

9. The hybrid cord as claimed in claim 1 having a construction of aramid 1680×2+nylon 235×1 or a construction of carbon fiber 1600×2+nylon 235×1.

10. The hybrid cord as claimed in claim 1 as comprised in a belt bandage that covers a belt radially on the outside of the pneumatic vehicle tire, wherein the pneumatic vehicle tire is of a radial type of construction with a multi-ply breaker belt.

11. A hybrid cord incorporated in a belt bandage of a pneumatic vehicle tire, the hybrid cord comprising at least a first yarn having a first end and a second yarn having a second end, wherein the first end and the second end are twisted together, and wherein the proportion of the first yarn in the hybrid cord is 90-95% by weight and an asymmetry of the first yarn and the second yarn is based on a shallow initial region of a force/elongation curve;
wherein the first yarn is a high-modulus yarn with a specified yarn fineness, wherein the second yarn being is a low-modulus yarn and having a lower yarn fineness than the first yarn, and wherein the yarn fineness of the first yarn in comparison with the yarn fineness of the second yarn is ≥1400 dtex; and,
wherein the elongation at break of the first yarn lies in a range of 1%-8% and the elongation at break of the second yarn lies in a range of 9%-30%.

12. The hybrid cord as claimed in claim 11, characterized in that the elongation at break of first yarn lies in a range of 3%-6% and the elongation at break of the second yarn lies in a range of 15%-25%.

13. The hybrid cord as claimed in claim 11, wherein the hybrid cord further comprises a high-modulus yarn of the same fineness as the first yarn.

14. The hybrid cord as claimed in claim 11, wherein the proportion of the first yarn in the hybrid cord is 90-95% by weight and the difference of the yarn fineness of the first yarn in comparison with the yarn fineness of the second yarn is ≥1400 dtex.

15. The hybrid cord as claimed in claim 11, wherein the first yarn is carbon fiber, glass fiber, basalt or aromatic polyamide, and wherein the second yarn is a polyamide or a polyester.

16. The hybrid cord as claimed in claim 11 having a construction of aramid 1680×2+nylon 700×1, or a construction of carbon fiber 1600×2+nylon 700×1.

17. The hybrid cord as claimed in claim 11 having a construction of aramid 1680×2+nylon 470×1, or a construction of carbon fiber 1600×2+nylon 470×1.

18. The hybrid cord as claimed in claim 11 having a construction of aramid 1680×2+nylon 235×1 or a construction of carbon fiber 1600×2+nylon 235×1.

19. The hybrid cord as claimed in claim 11 as comprised in a belt bandage that covers a belt radially on the outside of the pneumatic vehicle tire, wherein the pneumatic vehicle tire is of a radial type of construction with a multi-ply breaker belt.

20. A hybrid cord incorporated in a belt bandage of a pneumatic vehicle tire, the hybrid cord comprising at least a first yarn having a first end and a second yarn having a second end, wherein the first end and the second end are twisted together, and wherein the proportion of the first yarn in the hybrid cord is 80-95% by weight and an asymmetry of the first yarn and the second yarn is based on a shallow initial region of a force/elongation curve;
wherein the first yarn is a high-modulus yarn with a specified yarn fineness, wherein the second yarn being is a low-modulus yarn and having a lower yarn fineness than the first yarn, and wherein the yarn fineness of the first yarn in comparison with the yarn fineness of the second yarn is ≥800 dtex;
wherein the elongation at break of the first yarn lies in a range of 1%-8% and the elongation at break of the second yarn lies in a range of 9%-30%; and,
wherein the hybrid cord as has a construction of aramid 1680×2+nylon 700×1, or a construction of carbon fiber 1600×2+nylon 700×1; or,
wherein the hybrid cord as has a construction of aramid 1680×2+nylon 470×1, or a construction of carbon fiber 1600×2+nylon 470×1; or,
wherein the hybrid cord as has a construction of aramid 1680×2+nylon 235×1 or a construction of carbon fiber 1600×2+nylon 235×1.

* * * * *